July 12, 1932.    J. B. J. A. VIGNERON    1,867,196
TRAWL GEAR
Filed June 12, 1931

INVENTOR:
JEAN-BAPTISTE JOSEPH ALPHONSE VIGNERON

By: Purges & Boyce
ATTORNEYS.

Patented July 12, 1932

1,867,196

UNITED STATES PATENT OFFICE

JEAN BAPTISTE JOSEPH ALPHONSE VIGNERON, OF LA ROCHELLE, FRANCE, ASSIGNOR TO V. D. LIMITED, OF LONDON, ENGLAND

TRAWL GEAR

Application filed June 12, 1931, Serial No. 543,840, and in France July 24, 1930.

The present invention relates to improvements in or modifications to the trawling gears claimed in my prior specification No. 409,065 embodying a net without belly and without the usual ground rope which is stretched across the line of travel.

The invention has chiefly for its object:

1.—To secure a direct traction upon the rear pocket by cables running from the shear boards or from the boat, thereby relieving the upper or covering sheet of all stress;

2.—By eliminating the usual belly and ground rope, to prevent the consequent damage to such parts, the side edges of the net move lightly upon the sea-bottom after the manner of curtains, thus retaining the fish while allowing all detritus, stones, etc., to escape and nevertheless obviating the difficulties encountered in the construction of the trawl gears of the class referred to.

The essential feature of the invention consists in providing at the entrance of the rear pocket, either stretching slats, or small shear boards, or a rigid structure, or the like and in connecting the latter with the usual stretching slats or other rigid members which are arranged at the ends of the net wings, by means of one or more cables, parallel with the ground and of equal length, which cables serve as towing members for the direct traction of the rear pocket, said single cable or the lower cable being so arranged as to operate at a certain distance above the ground, and having suspended therefrom a weighted curtain of net fabric whose width is equal to the distance of said single or lower cable above the ground (when fishing upon a smooth bottom), or exceeds said distance (when fishing on a rough ground).

Said cables are obviously so located with reference to their two attaching points that the gear will possess the maximum stability.

In this manner, the gear will operate as an ordinary trawl gear, except that its lower edge, which is stretched by the traction, will operate above the ground in such manner that it will not catch upon obstacles and not collect detritus.

The curtain-like sheet of netting, which is weighted at its lower part, may be longer than the cable to which it is attached, in order that it may more readily conform to the irregularities of the ground. It may comprise suitably spaced slots, as well as breakable weaker parts which are adapted to be torn when an obstacle is met, and to thus afford passage to said obstacles, whereby all serious damage to the net proper will be obviated.

Figure 1:
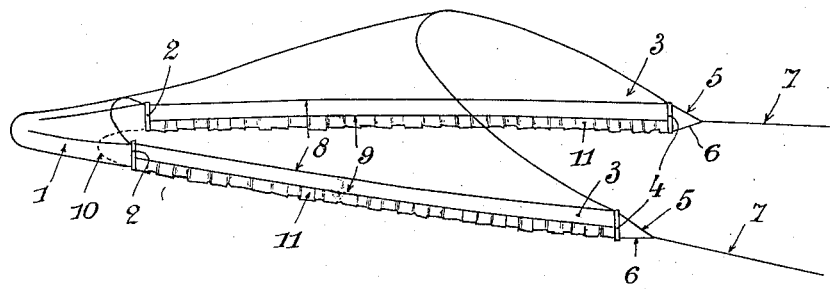
Figure 2:
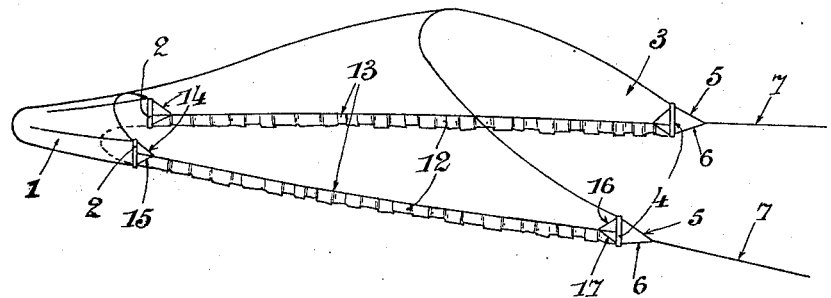

In the accompanying drawing, Figures 1 and 2 show two embodiments of the invention.

In Figure 1, the entrance of the rear pocket 1 is provided with stretching slats 2; the ends of the wings 3 are also provided with stretching slats 4 which are connected by crow foot connections 5—6 with dragging cables 7, connected with the shear boards or with the boat (not shown). The slats 2—4 are connected together by two parallel side cables 8—9. The cable 8 connects together the two slats at the top thereof, and the cable 9 connects together the two slats at a certain distance above the ground, for instance one foot.

It will be observed in Figure 1 that the ends of the ground rope 10 of the rear pocket 1 are attached to the lower parts of the stretching slats 2 of the rear pocket, and that the branches 5—6 of the crow foot of the dragging cable 7 are attached respectively to the top and bottom of the slats 4, as usual.

It will be readily understood that the proper equilibrium and stability of the net are assured in the aforesaid device exactly as would occur in the known gears if the side cable 9 were attached to the bottom part of the stretching slats and would operate as a ground rope.

To prevent the escape of the fish, a band of netting 11, as above mentioned, is suspended from the side rope 9; this floating band retains the fish but allows the obstacles to pass.

Figure 2 shows another embodiment of the invention, in which a single side rope connects together the stretching slats, or the like, the proper balance of the slats 2 and 4 being assured by means of two small crow foot connections 14—15 and 16—17. The curtain 12 is suspended from the single side rope 13, and it operates as above indicated.

The stretching slats located at the entrance of the rear pocket 2 and the stretching slats located at the ends of the net wings 4 may be of any suitable type and may be replaced by any other means adapted to afford the maximum stability of the wings 3, such as sledge devices, shoes, wooden or canvas shear panels, or the like.

The rear pocket may consist of a small net of a known type, such as a beam and irons trawl, ottertrawl net, V. D. net, Danish senne, etc.

The aforesaid embodiments of the invention are not of a limitative nature, and all modifications of the same remain within the scope of the invention.

It will be readily understood by the preceding description that the said apparatus will offer the following important advantages:

1.—The lower side edges of the net (lower cable 9 or side cable 13) will provide for the maximum stability of the net, and will not catch upon the bottom, since they operate above the ground.

2.—If the water rushes violently into the net, the net is not liable to rise from the ground, as the lower side cable 9 or the single side cable 13 is quite stable and supports the traction of the rear pocket, so that it will not be affected by the greater or less swelling of the covering sheet. In this manner, the curtain 12 which is attached to said single or lower side cable cannot rise from the ground to a height exceeding the distance of the cable above the ground; it can thus only rise by a few centimeters, and the fish will have but little chance of escape, aside from the fact that the lower part of the net always operates more or less in a region which is clouded by mud.

3.—As the lower side edges of the net are longer than the lower side cables to which they are attached, and as the slack is uniformly distributed upon the whole length of the side cable, this entirely prevents the formation of pockets which tend to be produced at the entrance of the rear pocket in the prior trawling gears of the class referred to.

Having now described my invention, what I claim as new and desire to secure by Letters Patent is:

1. A trawl net embodying a rear pocket, a covering sheet, rigid members at the inlet of said rear pocket, further rigid members at the front corners of the covering sheet, a traction cable attached to the corresponding lower lateral edge of the covering sheet and to the corresponding rigid members at a material distance above the base thereof, whereby said traction cables are raised above the ground by said rigid members and weighted flexible curtain-like members freely suspended from said traction cables.

2. A trawl net embodying a rear pocket, a covering sheet, stretching slats at the inlet of said rear pocket, rigid members at the front corners of the covering sheet, a traction cable attached to the corresponding lower lateral edge of said covering sheet and to the corresponding stretching slat and rigid member, at a material distance above the base thereof, whereby said traction cables are raised above the ground by said stretching slats and rigid members, and weighted flexible curtain-like members freely suspended from said traction cables.

In testimony whereof I have signed my name to this specification.

JEAN BAPTISTE JOSEPH ALPHONSE VIGNERON.